United States Patent
Brodd et al.

[11] Patent Number: 6,156,458
[45] Date of Patent: Dec. 5, 2000

[54] SOLID ELECTROLYTES CONTAINING TOUGHENING AGENTS AND ELECTROLYTIC CELLS PRODUCED THEREFROM

[75] Inventors: Ralph Brodd, Henderson, Nev.; Benjamin Chaloner-Gill, Santa Clara, Calif.; Milton Neal Golovin, Marietta, Ga.; Mark Isaacson, Santa Clara, Calif.; Joseph Lundquist, Hedgesville, W. Va.

[73] Assignee: Valence Technology, Inc., Henderson, Nev.

[21] Appl. No.: 08/735,879

[22] Filed: Oct. 23, 1996

[51] Int. Cl.⁷ .................................................. H01M 10/40
[52] U.S. Cl. ......................... 429/317; 429/309; 429/316
[58] Field of Search ................................ 429/192, 306, 429/317, 309, 316

[56] References Cited

U.S. PATENT DOCUMENTS

| | | |
|---|---|---|
| 4,913,988 | 4/1990 | Langan . |
| 4,990,413 | 2/1991 | Lee et al. ............................ 429/192 X |
| 5,470,357 | 11/1995 | Schmutz et al. . |
| 5,474,858 | 12/1995 | Merritt . |
| 5,616,437 | 4/1997 | Gao ...................................... 429/192 X |
| 5,766,787 | 6/1998 | Watanabe et al. ......................... 429/33 |

OTHER PUBLICATIONS

Second International Symposium on Polymer Electrodes, 1990, (no month) Wieczorek, W. et al., "Mixed Phase Solid Electrolytes Based on Poly(Ethylene Oxide) Systems", pp. 339–346.

*J. of Power Sources*, 32 (1990) 381–388 (no month).

*J. of Power Sources*, 37, (1992) 315–323 (no month).

*Primary Examiner*—John S. Maples
*Attorney, Agent, or Firm*—Young & Basile, P.C.

[57] ABSTRACT

A solid electrolyte containing a polymeric matrix, a salt, a solvent, and a toughening agent, is provided. The toughening agent may include alumina, silica, zeolite, and metal oxides (e.g., calcium oxide and magnesium oxide), and mixtures thereof. The toughening agent acts as a drying agent to remove excess solvent in the electrolyte. The solid electrolyte have improved mechanical strength and adherence to the anode and cathode.

12 Claims, No Drawings

6,156,458

SOLID ELECTROLYTES CONTAINING TOUGHENING AGENTS AND ELECTROLYTIC CELLS PRODUCED THEREFROM

BACKGROUND OF THE INVENTION

1. Field of the Invention

This invention is directed to solid electrolytes containing additives including a toughening agent and/or a basic sink material and, in particular, to solid electrolytes containing a polymeric matrix, a salt, a solvent, and said additives. The toughening agent imparts mechanical strength to the solid electrolyte and the basic sink removes or traps acids (e.g., HF) in the solid electrolyte.

2. State of the Art

Electrolytic cells containing an anode, a cathode and a solid solvent-containing electrolyte incorporating a salt are known in the art and are usually referred to as "solid batteries". See, for instant, U.S. Pat. Nos. 5,229,225, 5,238,758, 5,358,801, and 5,366,928. These cells offer a number of advantages over electrolytic cells containing a liquid electrolyte (i.e., "liquid batteries") including improved safety features.

Solid batteries employ a solid electrolyte interposed between a cathode and an anode. The solid electrolyte contains either an inorganic or an organic matrix and a suitable salt, such as an inorganic ion salt, as a separate component. Electrolytic cells containing a solid electrolyte having a polymeric matrix suffer from low ion conductivity and, accordingly, in order to maximize the conductivity of these materials, the matrix is generally constructed as a very thin film, i.e., in the range of about 25 to about 250 $\mu$m. Minimizing the thickness of the film reduces the total amount of internal resistance within the electrolyte but also decreases the solid electrolyte's structural integrity. In addition, good adherence of the anode and cathode to the solid electrolyte is necessary for optimum operation of electrochemical cells made therefrom.

Another problem encountered in electrolytic cells is the presence of impurities such as acids (e.g., HF) in the solid and liquid electrolytes. HF is derived from certain lithium salts (e.g., $LiPF_6$) that are employed. For example, $LiPF_6$ reacts with water to form HF, LiF (insoluble) and other by-products, thereby reducing the amount of salt available. The acids adversely effect electrochemical performance.

In view of the above, the art is in need of solid electrolytes having superior mechanical attributes, including toughness, hardness, and resiliency. In addition, the solid electrolyte should also adhere to the anode and cathode layers of the electrolytic cell to minimize internal resistance and increase electrochemical performance. Furthermore, there is a need to reduce or eliminate acidic impurities in the solid electrolyte.

SUMMARY OF THE INVENTION

The present invention is based, in part, to the discovery that adding a toughening agent to an electrolyte composition yields a stronger solid electrolyte that adheres well to the anode and cathode. Suitable toughening agents comprise alumina, silica, zeolites, metal oxides and mixtures thereof. The invention is also based in part on the discovery that alumina ($Al_2O_3$) acts as a base sink to remove or trap acidic impurities, especially HF.

In one aspect, the present invention is directed to an electrolytic cell which comprises: an anode; a cathode and a solid, solvent-containing electrolyte which comprises a polymeric matrix, a salt, a solvent, and a toughening agent, wherein the electrolyte is interposed between the anode and cathode.

In another aspect, the present invention is directed to a process for preparing the electrolytic cells which demonstrate improved electrochemical performance.

DETAILED DESCRIPTION OF THE PREFERRED EMBODIMENTS

This invention is directed to a solid, solvent-containing electrolyte comprising a toughening agent. One aspect of the invention is that the presence of the toughening agent enhances the mechanical strength of the solid electrolyte. Another aspect is that the solid electrolyte layer also demonstrates good adherence to the cathode and/or anode layers. It is believed that improvement in the structural integrity of the solid electrolyte is due, in part, to the ability of the toughening agent to also function as an absorbent (i.e., drying agent) to remove water, excess solvents and impurities. In particular, alumina, a toughening agent, also functions as a basic sink to remove a significant part of the acids from the solid electrolyte which improves cell performance and cycle life.

However, prior to describing this invention in further detail, the following terms are defined as follows:

The term "solid polymeric matrix" refers to an electrolyte compatible material formed by polymerizing organic monomers (or partial polymers thereof) and which, when used in combination with the other components of the electrolyte, renders the electrolyte solid.

The term "a solid matrix forming monomer" refers to organic materials which in the monomeric form can be polymerized, preferably in the presence of an inorganic ion salt, and a solvent to form solid matrices which are suitable for use as solid electrolytes in electrolytic cells. Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof.

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent, and toughening agent, and, optionally, a viscosifier. For example, a composition comprising requisite amounts of the solid matrix forming a monomer, salt, organic carbonate solvent, viscosifier and toughening agent can be applied to a substrate and then cured. Alternatively, the matrix forming monomer can be first cured and then dissolved in a suitable volatile solvent. Requisite amounts of the salt, organic carbonate solvent, viscosifier and toughening agent can then be added. The mixture is then placed on a substrate; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not require a separator as is typical of liquid electrolytes.

Alternatively, the solid polymeric matrix can be formed by a casting process which does not require the use of monomers or prepolymers, that is, no curing is required. A preferred method employs a copolymer of polyvinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon. Preferably, the toughening agent and/or basic sink material is incorporated into the solid polymeric matrix by adding the same to the solution prior to casting. Casting techniques of preparing electrolytic cells are described for in U.S. Pat. No. 5,584,893 filed on Nov. 17, 1995, which patent is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $SlO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, LiSCN, $LiBF_4$, $LiAsF_6$, $LiCF_3SO_3$, $LiPF_6$, $(CF_3SO_2)_2NLi$, $(CF_3SO_2)_3CLi$, NaSCN, and the like. The inorganic ion salt preferably contains at least one cation selected from the group consisting of Li, Na, Cs, Rb, Ag, Cu, Mg and K. When employing salts such as, for example, $LiBF_4$, $LiPF_6$, or $LiAsF_6$, which forms HF in the liquid and solid electrolytes, preferably a base sink material such as alumina is also added to the solid electrolyte to neutralize the HF.

The term "compatible electrolyte solvent" or "electrolytic solvent," or in the context of components of the solid electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, dimethyl carbonate, diethyl carbonate, gamma-butyrolactone, triglyme, tetraglyme, dimethylsulfoxide, dioxolane, sulfolane, and the like. A particularly preferred solvent is disclosed in U.S. Pat. No. 5,262,253, which is incorporated herein solvent is disclosed in U.S. Pat. No. 5,262,253, which is incorporated herein.

For electrochemical cells where the cathode comprises lithiated cobalt oxides, lithiated manganese oxides, or lithiated nickel oxides, and where the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate.

Suitable cyclic aliphatic carbonates for use in the invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like.

The term "toughening agnet" refers to a solid particulate, compatible in solid electrolytes, that enhances the solid electrolyte's structural integrity and adherence to the anode and cathode surfaces. Suitable solid particulates include alumina ($Al_2O_3$), silica ($SiO_2$) and zeolites. Aluminum oxide is most preferred since it can also function as a basic sink material that removes or neutralizes acids in the electrolyte. The basic sink material can be introduced in either the neutral or basic form because the surface of $Al_2O_3$ can be altered. Most likely, it is believed that the surface has the structure: Al(O)(OH) with the number of OH groups determining its basicity. In the neutral or basic form, the OH group on the alumina will strongly attract the F of HF via a hydrogen bond: Al(O)OH...FH. Thus, HF can be viewed as a sink because the HF reacts with or is "bonded" to the alumina and will not be released. The hydrogen bond between H and F is one of the strongest. The alumina effectively removes the HF from the system.

Zeolites suitable for use in the present invention include natural zeolites, such as hydrated silicates of aluminum and at least one of sodium and calcium, and synthetic zeolites, such as those made, for example, by a gel process (sodium silicate and alumina) and a clay process (kaolin), which form a matrix to which the zeolite is added and involve the substitution of various rare-earth oxides. Suitable toughening agents also include non-reactive metal oxide materials, e.g., calcium oxide and magnesium oxide. Mixtures of different toughening agents can be used. The toughening agent is preferably in powder form. Preferably, the size of the toughening agent ranges from about $0.1\mu$ to about $10\mu$, more preferably from about $0.3\mu$ to about $5\mu$, and most preferably from about $1\mu$ to about $3\mu$.

Preferably the toughening agent comprises about 0.1% (wt) to about 13% (wt), more preferably bout 2% (wt) to about 8% (wt), and most preferably about 3% (wt) to about 6% (wt) of the electrolyte layer.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The anode is typically comprised on a compatible anodic material which is any material which functions as an anode in a solid electrolytic cell. Such compatible anodic materials are well known in the art and include, by way of example, lithium, lithium alloys, such as allows of lithium with aluminum, mercury, manganese, iron, zinc, intercalation based anodes such as those employing carbon, tungsten oxides, and the like. Particularly preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode also may include an electron conducting material such as carbon black.

The cathode is typically comprised of a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated managanese oxides, e.g., $LiMn_2O_4$, lithiated nickel oxides, e.g., $LiNiO_2$, and mixtures thereof. Cathode-active material blends of $Li_xMn_2O_4$ (spinel) is described in U.S. Pat. No. 5,429,890 which is incorporated herein. The blends can also include $Li_xMn_2O_4$ (spinel) and at least one lithiated metal oxide selected from $Li_xNiO_2$ and $Li_xCoO_2$ wherein $0<x\leq2$.

A preferred method of fabricating an electrochemical cell is described herein. In addition, methods for preparing solid electrochemical cell sand batteries are described in the art, for example, in U.S. Pat. Nos. 5,300,373, 5,316,556, 5,346, 385, 5,262,253, 5,028,500, 4,472,487 and 4,668,595, which are all incorporated herein.

In one preferred embodiment, the cathode is prepared from a cathode paste which comprises from about 35 to 65 weight percent of a compatible cathodic material; from about 1 to 20 weight percent of an electroconductive agent; from about 0 to 20 weigh percent of polyethylene oxide having a number average molecular weight of at least 100,000. When the cathode includes $V_6O_{13}$, the cathode paste preferably further comprises from about 10 to 50 eight percent of solvent comprising a 10:1 to 1:4 (w/w) mixture of an organic carbonate and a glyme. The paste further comprises from about 5 weight percent to about 25 weight percent of the solid matrix forming monomer or partial polymer thereof. Also included in an ion conducting amount of an inorganic ion salt. Generally, the amount of the salt is from about 1 to about 25 weight percent. (All weight percents are based on the total weight of the cathode).

The electrolyte composition typically comprises from about 5 to about 25 weight percent of the inorganic ion salt based on the total weight of the electrolyte; preferably, from about 10 to 20 weight percent; and even more preferably from about 10 to about 25 weight percent. The percentage of salt depends on the type of salt and electrolytic solvent employed.

The electrolyte composition typically comprises from 40 to about 80 weight percent electrolyte solvent (e.g., organic carbonate/glyme mixture) based on the total weight of the electrolyte; preferably from about 60 to about 80 weight percent; and even more preferably about 70 weight percent. The electrolyte composition typically comprises from about 5 to about 30 weight percent of the solid polymeric matrix based on the total weight of the electrolyte; preferably from about 10 to about 20 weight percent. The electrolyte composition comprises from about 1 to about 15 weight percent toughening agent, based on the total weight of the electrolyte; preferably from about 5 to about 10 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100, 000. Preferably, the film forming agent is employed in an amount of about 1 to about 10 weight percent and more preferably at about 2.5 weight percent based on the total weight of the electrolyte composition.

EXAMPLE 1

A. The Cathode

The cathode may be prepared from a cathodic paste which, in turn, may be prepared from a cathode powder as follows:

i. Cathode Powder

The cathode powder can be prepared by combining 90.44 weight percent $V_6O_{13}$ (prepared by heating ammonium metavanadate ($NH_4^+VO_3^-$) at 450° C. for 16 hours under $N_2$ flow) and 9.56 weight percent of carbon (from Chevron Chemical Company, San Ramon, Calif. under the trade name of Shawinigan Black®). About 100 grams of the resulting mixture can be placed into a grinding machine (Attritor Model S-1 purchased from Union Process, Akron, Ohio) and ground for 45 minutes. Afterwards, the resulting mixture can be dried at about 260° C. for 16 hours under vacuum which should provide a cathode powder having about 84.45 weight percent $V_6O_{13}$.

The above mixing procedure can be repeated to provide for a total of 292 grams of cathode powder.

ii. Cathode Paste

A cathode paste may be prepared by combining sufficient cathode powder which should provide for a final product having 45 weight percent $V_6O_{13}$.

Specifically, bout 26.2 grams of unground carbon (from Chevron Chemical Company, San Ramon, Calif. under the trade name of Shawinigan Black®) can be combined in a glove box (under dry (<10 ppm $H_2O$) argon at ambient temperature and pressure) with bout 169.9 grams of a 4:1 w/w mixture of propylene carbonate/triglyme and the resulting composite mixed under dry argon and at ambient temperature and pressure on a double planatory mixer (Ross #2 mixer available from Charles Ross & Sons, Company, Hauppag, N.Y.) at about 25 rpms until a paste is formed.

About 225.0 grams of a cathode powder prepared in a manner similar to that described above can be added to the mixer along with an additional 169.9 grams of the 4:1 mixture of propylene carbonate/triglyme and the resulting composite can be mixed under dry argon and at ambient temperature and pressure on a double planatory mixer at about 25 rpms until a dry paste is formed.

About 5 grams of polyethylene oxide (number average molecular weight about 600,000 available as Polyox WSR-205 from Union Carbide Chemicals and Plastics, Danbury, Conn.), about 42.5 grams of polyethylene glycol diacrylate (molecular weight about 500 available as SR-344 from Sartomer Company, Inc., Exton, Pa.) and containing less than bout 500 ppm of inhibitor, and about 7.5 grams of ethoxylated trimethylpropane triacrylate (TMPEOTA) (molecular weight about 425 available as SR-454 from Sartomer Company, Inc., Exton, Pa.) and containing less than about 50 ppm of inhibitor can be added to about 169.9 grams of a 4:1 mixture of propylene carbonate/triglyme and this mixture added to the mixer.

The resulting slurry in the mixer can be heated at about 65° C. while mixing for 2 hours at 60 rpms to provide for the cathodic paste which would have the following approximate weight percent of components:

| | |
|---|---|
| $V_6O_{13}$ | 45.00 weight percent |
| Carbon | 10.00 weight percent |
| propylene carbonate | 27.18 weight percent |
| Triglyme | 6.80 weight percent |
| Polyethylene glycol diacrylate | 8.51 weight percent |
| Ethoxylated trimethylpropane triacrylate[1] | 1.51 weight percent |
| Polyethylene oxide | 1.00 weight percent |

[1]Inhibitor may be removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin, which results in less than 50 ppm of inhibitor in the product.

In an alternative embodiment, the requisite amounts of all of the cathodic materials other than the cathode powder can be combined to form a first mixture ad this first mixture is combined with the cathode powder to form a second mixture. This second mixture can be then thoroughly mixed to provide for the cathode paste.

The cathode paste which can be prepared as above can be placed onto a sheet (about 1 mil (N-25 $\mu$m) thick by 10 cm wide) of a roughened nickel on nickel current collector (available as CF18/NiT from Fukuda Metal Foil & Powder Company, Ltd., Kyoto, Japan). A Mylar cover sheet can then be placed over the paste and the paste spread to a thickness of about 75 microns ($\mu$m) with a conventional plate and roller system and cured by continuously passing the sheet through an electron beam apparatus (Electrocurtain, Energy Science Inc., Woburn, Mass.) at a voltage of about 175 kV and a current of about 12 mA and at a conveyor belt speed setting of 50 which provides a conveyor speed of about 3 in/sec. After curing, the Mylar sheet can be removed which should provide for a solid cathode laminated to a nickel on nickel current collector.

B. Electrolyte

The electrolyte may be prepared by first combining 52 grams of propylene carbonate, 13 grams of triglyme and 17 grams of urethane acrylate (available as Photomer 6140 from Henkel Corporation, Coating and Chemicals Division, Ambler, Pa.). The propylene carbonate/triglyme/urethane acrylate mixture can be dried over molecular sieves (Grade 514, 4 Å, 8–12 mesh, available from W.R. Grace, Baltimore, Md.) to remove water.

This solution can then be combined with 3 grams of polyethylene oxide (weight average molecular weight about 600,000 available as Polyox WSR-205 from Union Carbide Chemicals and Plastics, Danbury, Conn.). The mixture can then be thoroughly mixed with the same laboratory mixer at heating until a temperature of about 65° C. is reached and then cooled to ambient temperature over at least a 2 hours period while stirring is maintained.

Once the polyethylene oxide is dispersed and dissolved, 5 grams of $LiAsF_6$ (available from FMC Corporation Lithium Division, Bessemer City, N.C., as Lectrosalt®), 5 grams of $Li(OCH_2CH_2)_3OCH_3$ and 5 grams of alumina can be added while stirring with a laboratory mixer (Yamato Model LR41B, available from Fisher Scientific, Santa Clara, Calif.). The $Li(OCH_2CH_2)_3OCH_3$ salt can be prepared from a 1:1 molar ratio n-butyl lithium and the monomethylether of triethylene glycol in tetrahydrofuran at −78° C. Other aprotic solvents could also be used.

The resulting 100 gram mixture would contain the following weight percent of components:

| | |
|---|---|
| Propylene carbonate | 52 weight percent |
| Triglyme | 13 weight percent |
| Urethane acrylate (Photomer 6140) | 17 weight percent |
| $LiAsF_6$ | 5 weight percent |
| $Li(OCH_2CH_2)_3OCH_3$ | 5 weight percent |
| Polyethylene oxide | 3 weight percent |
| Alumina | 5 weight percent. |

Afterwards, the electrolyte mixture can then be coated by a conventional knife blade to a thickness of about 50 $\mu$m onto the surface of the cathode sheet prepared as above (on the side opposite that of the current collector) but without the Mylar covering. The electrolyte can then be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which should contain a solid electrolyte laminated to a solid cathode which, in turn, is laminated to a nickel on nickel current collector.

C. Anode

The anode may comprise a sheet of lithium foil (about 76 μm thick) which is commercially available from FMC Corporation Lithium Division, Bessemer City, N.C.

D. The Solid Battery

A solid batter may be prepared by first preparing a cathodic paste as described above which can be spread onto a substrate, e.g., a current collector, and then cured to provide the cathode. An electrolyte composition as described above can then be placed onto the cathode surface and cured to provide for the solid electrolyte. Then, the anode can be laminated onto the solid electrolyte to provide for the solid battery.

EXAMPLE 2

A solid electrolytic cell can be prepared by first preparing a cathodic paste which is spread onto a current collector and cured to provide for the cathode. An electrolyte solution can be placed onto the cathode surface and cured to provide for the solid electrolyte composition. Then, the anode can be laminated onto the solid electrolyte composition to provide for a solid electrolytic cell. The specifics of this construction are as follows:

A. The Current Collector

The current collector is a sheet of aluminum foil having a layer of adhesion promoter attached to the surface of the foil which should contact the cathode so as to form a composition having a sheet of aluminum foil, a cathode and a layer of adhesion promoter interposed therebetween.

Specifically, the adhesion promoter layer can be prepared as a dispersed colloidal solution by one of two methods. The first preparation of this colloidal solution for this example can be as follows:

- 84.4 weight powder of carbon powder (Shawinigan Black™—available from Chevron Chemical Company, San Ramon, Calif.)
- 337.6 weight percent of a 25 weight percent solution of polyacrylic acid (a reported average molecular weight of about 90,000, commercially available from Aldrich Chemical Company—contains about 84.4 grams polyacrylic acid and 253.2 grams water)
- 578.0 weight percent of isopropanol The carbon powder and isopropanol can be combined with mixing in a conventional high shear colloid mill mixer (Ebenback-type colloid mill) until the carbon is uniformly dispersed and the carbon particle size is smaller than 10 microns. AT this point, the 25 weight percent solution of polyacrylic acid can be added to the solution and mixed for approximately 15 minutes. The resulting mixture can be pumped to the coating head and roll coated with a Meyer rod onto a sheet of aluminum foil (about 9 inches wide and about 0.0005 inches thick). After application, the solution/foil can be contacted with a Mylar wipe (about 0.002 inches thick by about 2 inches and by about 9 inches wide—the entire width of aluminum foil). The wipe can be flexibly engaged with the foil, i.e., the wipe contacts the foil, to redistribute the solution so as to provide a substantially uniform coating. Evaporation of the solvents, i.e., water and isopropanol, via a conventional gas-fired oven can provide for an electrically conducting adhesion-promoter layer of about 6 microns in thickness or about $3\times10^{-4}$ grams per $cm^2$. The aluminum foil can be cut to about 8 inches wide by removing approximately ½ inch form either side by the use of a conventional slitter so as to remove any uneven edges.

In order to further remove the aprotic solvent from this layer, the foil can be redried. In particular, the foil can be wound up and a copper support can be placed through the roll's cavity. The roll can be hung overnight from the support in a vacuum oven maintained at about 130° C. Afterwards, the roll can be removed. In order to avoid adsorption of moisture from the atmosphere, the roll can be preferably stored in a dessicator or other similar anhydrous environment to minimize atmospheric moisture content until the cathode paste is ready for application onto this roll.

The second preparation of this colloidal solution can comprise mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring can be done in a 30 gallon polyethylene drum with a gear-motor mixer, e.g., Lighting Labmaster Mixer, model XJ-43, available from Cole-Parmer Instruments Co., Niles, Ill., at 720 rep with two 5 inch diameter A310-type propellers mounted on a single shaft. This procedure can wet down the carbon and eliminate any further dust problem. The resulting weight of the mixture should be about 143.5 lbs and contain some "lumps".

The mixture can be further mixed with an ink mill which consists of three steel rollers almost in contact with each other, turning at 275, 300, and 325 rpms, respectively. This high shear operation allow particles that are sufficiently small to pass directly through the rollers. Those that do not pass through the rollers can continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) should indicate that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol can be mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). The composition can be gear pumped through a 25 μm cloth filter, e.g., So-Clean Filter Systems, American Felt and Filter Company, Newburgh, N.Y., and Meyer-rod coated as described above.

B. The Cathode

The cathode can be prepared from a cathodic paste which, in turn, can be prepared from a cathode powder as follows:

i. Cathode Powder

The cathode powder can be prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black™). About 100 grams of the resulting mixture can be placed into a grinding machine (Attritor Model S-1 purchased from Union Process, Akron, Ohio) and ground for 30 minutes. Afterwards, the resulting mixture can be dried at about 260° C. for 21 hours.

ii. Cathode Paste

A cathode paste can be prepared by combining sufficient cathode powder which should provide for a final product having 45 weight percent $V_6O_{13}$.

Specifically, 171.6 grams of a 4:1 weight ratio of propylene carbonate:triglyme can be combined with 42.9 grams of polyethylene glycol diacrylate (molecular weight about 400 available as SR-344 from Sartomer Company, Inc., Exton, Pa.), and about 7.6 grams of ethoxylated trimethylolpropane triacrylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture can be inserted into the double planetary mixer and the resulting mixture can be stirred at 150 rpms until homogeneous. The resulting solution can be passed through sodiated 4 Å molecular sieves. The solution can be returned to a double planetary mixer equipped with the propeller mixer and about 5 grams of polyethylene oxide (number average molecular weight about 600,000 available as Polyox WSR-205 from Union Carbide Chemicals and Plastics, Danbury, Conn.) can be added to the solution vortex by a mini-sieve such as a 25 mesh mini-sieve commercially available as Order No. 57333-965 from VWR Scientific, San Francisco, Calif.

The solution can be heated while stirring until the temperature of the solution reaches 65° C. At this point, stirring can be continued until the solution is completely clear. The propeller blade can be removed and the cathode powder prepared as above can be added as well as an additional 28.71 grams of unground carbon (from Chevron Chemical Company, San Ramon, Calif. under the tradename of Shawinigan Black™). The resulting mixture can be mixed at a rate of 7.5 cycles per second for 30 minutes in the double planetary mixer. During this mixing the temperature can slowly increase to a maximum of 73° C. At this point, the mixing can be reduced to 1 cycle per second and the mixture can be slowly cooled to a temperature of from 40° C. to 48° C., e.g., about 45° C. The resulting cathode paste can be maintained at this temperature until just prior to application onto the current collector.

The resulting cathode paste can have the following approximate weight percent of components:

| | |
|---|---|
| $V_6O_{13}$ | 45 weight percent |
| Carbon | 10 weight percent |
| 4:1 propylene carbonate/tri-glyme | 34 weight percent |
| polyethylene oxide | 1 weight percent |
| polyethylene glycol diacrylate | 8.5 weight percent |
| ethoxylated trimethylol-propane triacrylate | 1.5 weight percent |

In an alternative embodiment, the requisite amounts of all of the solid components can be added directly to the combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated should have a volume to surface area ratio such that the entire mass is heated during the heating step.

The cathode paste noted above can be placed onto the adhesion layer of the current collector described above by extrusion at a temperature of from about 45° to about 48° C. A Mylar cover sheet can be placed over the paste and the paste can be spread to a thickness of about 90 microns ($\mu$m) with a conventional plate and roller system and can be cured by continuously passing the sheet through an electron beam apparatus (Electro-curtain, Energy Science Inc., Woburn, Mass.) at a voltage of about 175 kV and a current of about 1.0 mA and at a rate of about 1 cm/sec. After curing, the Mylar sheet can be removed to provide for a solid cathode laminated to the aluminum current collector described above.

C. Electrolyte 48 grams of propylene carbonate, 12 grams of triglyme, and 17 grams of urethane acrylate (Photomer 6140, available from Henkel Corp., Coating and Chemical Division, Ambler, Pa.) can be combined at room temperature until homogeneous. The resulting solution can be passed through a column of 4 Å sodiated molecular sieves to remove water and then can be mixed at room temperature until homogeneous.

At this point, 4 grams of polyethylene oxide having a number average molecular weight of about 600,000 (available as Polyox WSR-205 from Union Carbide Chemicals and Plastics, Danbury, Conn.) and 10 grams of silica can be added to the solution and then dispersed while stirring with a magnetic stirrer over a period of about 120 minutes. After dispersion, the solution can be heated to between 60° C. and 65° C. with stirring until the viscosifier dissolves. The solution can be cooled to a temperature of between 45° and 48° C., a thermocouple can be placed at the edge of the vortex created by the magnetic stirrer to monitor solution temperature, and then 9 grams of $LiPF_6$ can be added to the solution over a 120 minute period while thoroughly mixing to ensure a substantially uniform temperature profile throughout the solution. Cooling can be applied as necessary to maintain the temperature of the solution between 45° and 48° C.

In one embodiment, the polyethylene oxide can be added to the solution via a mini-sieve such as a 25 mesh mini-sieve commercially available as Order No. 57333-965 from VWR Scientific, San Francisco, Calif.

The resulting solution should contain the following:

| Component | Amount |
|---|---|
| Propylene Carbonate | 48 g |
| Triglyme | 12 g |
| Urethane Acrylate | 17 g |
| $LiPF_6$ | 9 g |
| PEO | 4 g |
| Silica | 10 g |
| Total | 100 g |

This solution can be degassed to provide for an electrolyte solution wherein little, if any, of the $LiPF_6$ salt decomposes.

Optionally, solutions which can be produced as above and which contain the prepolymer, the polyethylene oxide, the toughening agent, the electrolyte solvent and the $LiPF_6$ salt can be filtered to remove any solid particles or gels remaining in the solution. One suitable filter device is a sintered stainless steel screen having a pore size between 1 and 50 $\mu$m at 100% efficiency. Smaller screens may be required depending on the size of the toughening agent particles.

Alteratively, the electrolyte solution can be prepared in the following manner. Specifically, in this example, the mixing procedure can be conducted using the following weight percent of components:

| | |
|---|---|
| Propylene Carbonate | 44 weight percent |
| Triglyme | 11 weight percent |
| Urethane Acrylate[b] | 20 weight percent |
| $LiPF_6$ | 10 weight percent |
| PEO[c] | 5 weight percent |
| Silica | 10 weight percent |

[b](Photomer 6140, available from Henkel Corp., Coating and Chemical Division, Ambler, PA)
[c]polyethylene oxide having a number average molecular weight of about 600,000 (available as Polyox WSR-205 from Union Carbide Chemicals and Plastics, Danbury, CT)

The mixing procedure employs the following steps:
1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4 Å molecular sieves (Grade 514, 8–12 Mesh from Schoofs Inc., Moraga, Calif.) and then proceed to step 4.
2. Dry the propylene carbonate and triglyme over sodiated 4 Å molecular sieves (Grade 514, 8–12 Mesh from Schoofs Inc., Moraga, Calif.).
3. At room temperature, <30° C., add the urethane acrylate to the solvent prepared in step 2. Stir at 300 rpm until the resin is completely dissolved. The solution should be clear and colorless.
4. Dry and then sift the polyethylene oxide through a 25 mesh mini-sieve commercially available as Order No. 57333-965 from VWR Scientific, San Francisco, Calif. While stirring at 30 rpm, add the dried and pre-sifted polyethylene oxide slowing to the solution. The polyethylene oxide should be sifted into the center of the vortex formed by the stirring means over a 30 minute period. Addition of the polyethylene oxide should be dispersive and, during addition, the temperature should be maintained at room temperature (<30° C.).
5. After final addition of the polyethylene oxide, add the silica and stir an additional 30 minutes to ensure that the viscosifier is substantially dispersed.
6. Heat the mixture to 68° C. to 75° C. and stir until the viscosifier has melted and the solution has become transparent to light yellowing color. Optionally, in this step, the mixture is heated to 65° C. to 68° C.
7. Cool the solution produced in step 6 and when the temperature of the solution reaches 40° C., add the $LiPF_6$ salt very slowly making sure that the maximum temperature does not exceed 55° C.
8. After the final addition of the $LiPF_6$ salt, stir for an additional 30 minutes, degas, and let sit overnight and cool.
9. Filter the solution through a sintered stainless steel screen having a pore size between 1 and 50 $\mu$m at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 $\mu$m onto the surface of the cathode sheet prepared as above (on the side opposite that of the current collector) but without the Mylar covering. The electrolyte should be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite can be recovered which contains a solid electrolyte laminated to a solid cathode.

D. Anode

The anode can comprise a sheet of lithium foil (about 76 $\mu$m thick) which is commercially available from FMC Corporation Lithium Division, Bessemer City, N.C.

E. The Solid Electrolytic Cell

A sheet comprising a solid battery can be prepared by laminating the lithium foil anode to the surface of the electrolyte in the sheet produced in step C above. Lamination can be accomplished by minimal pressure.

EXAMPLE 3

Experiments were conducted which demonstrated that adding alumina to electrolytes did not adversely effect its viscosity or ionic conductivity. Alumina was added to two electrolyte solutions in accordance with the procedures set forth in Example 2. The two electrolyte solutions are designated "premix" and "standard electrolyte" herein and the components for each solution are set forth in the following table. The alumina used was in powder form with an average size of 1.5 micron. (The alumina was from Fujimi Corp., Elmhurst, Ill.)

| Premix | Weight % | Standard Electrolyte | Weight % |
|---|---|---|---|
| Propylene Carbonate | 58.00 | Prolylene Carbonate | 56.51 |
| Triglyme | 14.50 | Triglyme | 14.13 |
| Urethane Acrylate | 18.02 | Urethane Acrylate | 17.56 |
| $LiPF_6$ | 9.48 | $LiPF_6$ | 9.24 |
| | | PEO | 2.56 |
| Total | 100% | Total | 100% |

As is apparent, the components of the premix and the standard electrolyte are the same except that the latter contains polyethylene oxide which is a viscosifier. Alumina was added to the formulations to produce 5% and 10% (wt) alumina mixtures. Viscosity measurements indicate that the addition of alumina had negligible effect on the viscosity.

The conductivities of the uncured electrolyte mixtures containing alumina were measured and the results are as follows:

|  | $\sigma/mScm^{-1}$ |
|---|---|
| Premix 5% | 3.19 |
| Premix 10% | 3.09 |
| Std. Electrolyte 5% | 2.82 |
| Std. Electrolyte 10% | 2.86 |
| Std. Electrolyte (without toughening agent) | 3.00 |

The data indicate that the electrolytes maintained good conductivity with the addition of alumina.

The following illustrates a method of fabricating an electrolytic cell wherein the solid polymeric matrix is formed by a casting process. Examples 4A and 4B describe the process of preparing the anode slurry and cathode slurry, respectively. Examples 4C describes the procedures of assembling the electrolytic cell.

EXAMPLE 4A

The anode current collector was a sheet of expanded copper metal that is about 50 μm thick. It is available under the designation 2Cu5-125 (flatten) from Delker Corp., Brandford, Conn.

The anode slurry was prepared as follow:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, San Francisco, Calif., model H-04172-00. the copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebroek, Belgium. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 4B

The cathode current collector employed was a sheet of expanded aluminum that is about 50 μm thick. The aluminum grid is available under the designation 2AL5-077 from Delker Corp.

The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material comprising $Li_wMn_2O_4$ (spinel) ($0 \leq x<2$), 2.4 grams of carbon black (Super P™) into a solution containing 60 grams acetone, and 8.7 grams dibutyl phthalate. The mixture was then vigorously mixed in a high shear mixer until a substantially homogeneous blend was formed.

The cathode slurry was prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 4C

A solid electrochemical cell precursor is prepared by positioning a polymeric matrix between the anode and cathode and thereafter laminating the structures under moderate pressure and/or temperature (e.g., 130° C.). The pressure and temperature employed will depend on the polymer (s) forming the matrix. The polymeric matrix is formed by casting a slurry comprising acetone, dibutyl phthalate, silanized fumed $SiO_2$, and a PVDF/HFP copolymer onto a carrier web or other substrate and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the slurry is mixed under low shear conditions as not to degrade the copolymer.

Next the dibutyl phthalate, a plasticizer, is extracted from the precursor or plurality of electrochemical cell precursors in the case of a battery. Extraction can be accomplished using conventional organic liquid solvents such as diethyl ether or by a supercritical fluid which includes, for example, a gas compressed and heated to either supercritical or subcritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide.

Following extraction, the precursor is then packaged in moisture-impermeable material which is described, for example, in U.S. Pat. No. 5,326,653 which is incorporated herein. The precursor is then activated by the addition of an inorganic salt and electrolyte solvent. Extraction and activation preferably take place in an inert (e.g., argon) atmosphere. Finally, the packaging is sealed. In assembling the components, the anode precursor, cathode precursor, and polymeric electrolyte precursor are preferably fused together by the application of moderate pressure and heat (e.g., 130° C.) to cause the polymeric components of the anode and cathode precursors to adhere to the polymeric layer.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. An electrochemical cell which comprises:
   an anode;
   a cathode;
   and interposed there between a solid, solvent-containing electrolyte which comprises:
      a solid polymer matrix;
      a salt;
      a solvent; and
      a toughening agent that comprises zeolite.

2. The electrochemical cell of claim 1, wherein the toughening agent comprises from about 1% to about 15% by weight of the solid electrolyte.

3. The electrochemical cell of claim 1, wherein the toughening agent comprises from about 3% to about 8% by weight of the solid electrolyte.

4. The electrochemical cell of claim 1 wherein the anode comprises an intercalation based anode comprising carbon.

5. The electrochemical cell of claim 1 wherein the cathode comprises material selected from the group consisting of vanadium oxide, lithiated manganese oxide, lithiated nickel oxide, lithiated cobalt oxide, and mixtures thereof.

6. The electrochemical cell of claim 5, wherein the anode comprises an intercalation based anode comprising carbon.

7. An electrochemical cell which comprises:
   an anode;
   a cathode;
   and interposed there between a solid, solvent-containing electrolyte which comprises:
      a solid polymeric matrix;
      a salt;
      a solvent; and
      a toughening agent that comprises a material that is selected from calcium oxide, magnesium oxide, and mixtures thereof.

8. The electrochemical cell of claim 7, wherein the toughening agent comprises from about 1% to about 15% by weight of the solid electrolyte.

9. The electrochemical cell of claim 7, wherein the toughening agent comprises from about 3% to about 8% by weight of the solid electrolyte.

10. The electrochemical cell of claim 7 wherein the anode comprises an intercalation based anode comprising carbon.

11. The electrochemical cell of claim 7 wherein the cathode comprises material selected from the group consisting of vanadium oxide, lithiated manganese oxide, lithiated nickel oxide, lithiated cobalt oxide, and mixtures thereof.

12. The electrochemical cell of claim 11, wherein the anode comprises an intercalation based anode comprising carbon.

* * * * *